Sept. 3, 1929.　　　E. P. STEVENS　　　1,727,138
ART OF MAKING FIRE BRICK
Filed May 23, 1922
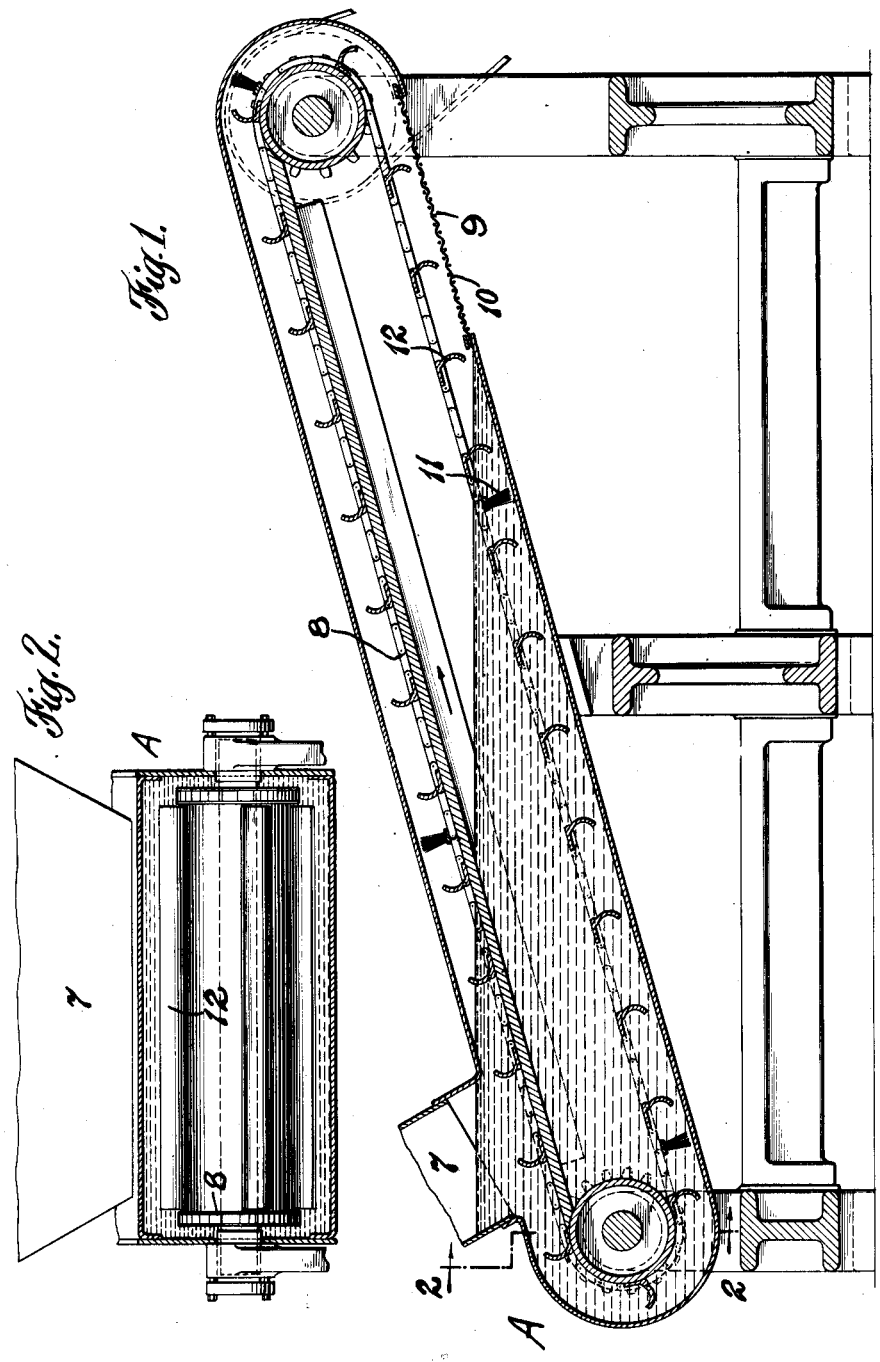

Patented Sept. 3, 1929

1,727,138

UNITED STATES PATENT OFFICE.

ENOCH P. STEVENS, OF CHICAGO, ILLINOIS; MARY ANN STEVENS EXECUTRIX OF SAID ENOCH P. STEVENS, DECEASED.

ART OF MAKING FIRE BRICK.

Application filed May 23, 1922. Serial No. 563,045.

This invention relates to improvements in the art of making fire brick and the like, and it has for its primary object not only the reduction in the cost of manufacture, but also the improvement of the quality, strength and life of the bricks.

The nature of my invention and its objects and advantages will be best understood from a brief description of the present practice in this art.

Heretofore in this art, it has been the practice to grind the clay in preparing it for manufacture into bricks. Attempt has been made in the past to weather the clay in the open but this in itself was not sufficient to disintegrate the clay to anything near the required state of division or fineness, as the result of which, in addition to such abortive weathering, grinding of the clay was resorted to. This grinding not only involves considerable expense, but as a result thereof those very physical properties of the clay which render it useful and adaptable for fire brick are, if not destroyed, very greatly impaired, the very nature of a grinding operation being such as to reduce quantities of the clay being treated to finely powdered or pulverized form. In consequence, it will be seen that in addition to the impairment of the physical characteristics of the clay, the clay particles would not be of uniform size or condition and, therefore, the bricks would not be of uniform construction throughout and the internal strains to which the bricks would be subjected in service would not be uniformly distributed. Furthermore, it was practically impossible to make the bricks true to form as they become warped and crooked in drying and burning. These contribute to early fracture and breakage in service.

Also, it was practically impossible to avoid "porosity", and the bricks had considerable capacity for the absorption of impurities from the fuel and flame, which has a tendency to lower the fusion and softening point of the bricks with a consequent shortening of their life.

The binder employed has been customarily added in dry form and this did not mix uniformly and it was also such that the softening and fusion points of the bricks, considered as a whole, were lowered.

By my invention I propose to overcome the foregoing difficulties and to economically and expeditiously produce bricks, the product as a whole being uniform, and the bricks themselves being uniform in construction and having uniform tensile strength throughout, with uniform heat radiation capacity, porosity or voids being substantially eliminated and a greater degree of perfection in workmanship being obtained.

The foregoing, together with such other objects as may hereinafter appear, or are incident to my invention, I obtain by means of a method, certain steps of which are diagrammatically indicated in the accompanying drawings, wherein:

Fig. 1 is a longitudinal section through certain apparatus which may be employed in carrying out my invention; and Fig. 2 is a section taken on the line 2—2 of Fig. 1.

In carrying out my invention, I propose to take the raw clay—flint, semi-flint, plastic or semi-plastic, as the case may be—and preliminarily crush it in a suitable crushing machine to break up the big lumps, no attempt being made to obtain fineness. This crushed material I then artificially weather by a suitable aqueous agent and heat. To this end, I may subject the crushed material to a bath of hot water, or to a blast of steam, or I may moisten the crushed material and supply the heat as by way of a hot air blast, for example. The effect of the moisture and the heat is to cause the particles and lumps of the crushed clay to disintegrate, the fineness of disintegration being dependent upon the length of time which the material is subjected to the hot aqueous bath, or the like. By this method, the clay is reduced to a granular state in contradistinction to the fine powder or "flour" produced in grinding.

In the drawings I have shown a tank A, partially filled with hot water, the crushed clay being introduced into the bath through the inlet 7, the clay settling or depositing through the bath onto the conveyor 8, which travels in the direction of the arrow and which may be of any suitable construction and by which the clay is ultimately removed from the bath and carried to a point of discharge indicated by the reference character 9. The speed of the conveyor will largely determine the length of time during which the clay is immersed in the bath, and this will determine the degree of fineness to which the clay is disintegrated. I prefer to use a screen over the discharge opening 9 for several reasons. One of these is that any lumps of clay which may not have been disintegrated will be again passed through the bath. Another reason is that I am thereby enabled to remove some of te impurities such as pyrites, etc., which may have been separated from the clay on the screen, which I have indicated at 10. The conveyor may be provided with one or more brushes 11. These brushes, as well as the conveyor shelves 12 will serve to agitate any clay that may work to the bottom of the bath and will prevent sedimentation which would be injurious in case the water in the tank were heated by the application of external heat.

The disintegrated material discharging from the outlet 9 preferably either drops directly into a rotary calcining machine or onto suitable conveying mechanism leading to such a machine. The material is dried and calcined in this machine, the "finishing" of the disintegration being preferably accomplished in the wet end of the dryer or calciner. The clay should preferably be calcined to a temperature at least in the neighborhood of that to which the finished product or article to be fabricated therefrom will be subjected in service, a range of temperature from 2400° F. to 3200° F. being satisfactory for most ordinary uses of high grade fire brick.

The calcined material is then preferably allowed to cool, say for example, to a temperature in the neighborhood of from 100 to 200° F. For the purpose of fabrication, there is added to the still warm calcined granules a binder in liquid form, such for example as a liquid clay or cement binder, also warm, and of approximately the same temperature as the clay. For all practical purposes, the combined moisture has been driven out during the calcination of the clay; and as I use a relatively small percentage of the aqueous binder, the amount of moisture thereby introduced that is taken up by the clay is negligible,—a considerable portion thereof being vaporized. The application of the warm liquid binder to the calcined clay results in a uniform application of the binder which coats the particles of the clay, the heat causing the material to dry quickly. The material is then pressed into bricks, preferably in a machine press.

Where a liquid clay binder is used, I then burn the bricks, preferably at least to a temperature sufficient to drive off what little moisture there may be in the binder. Where a cement binder is employed, it may not be necessary to burn or bake the bricks.

By the foregoing process I find that I can ensure a much more uniform degree of fineness than has been the case heretofore, and in addition I do not impair the physical characteristics of the clays which make them useful for fire brick. As before pointed out, I am thus enabled to produce bricks which are substantially uniform in structure throughout and which, therefore, have uniform heat radiating properties throughout and in which the internal strains set up in service are better and more uniformly distributed, and in which porosity is practically eliminated. The bricks, therefore, have greater strength and superior surface, and more strongly resist the abrasive and scouring action of the fuel and flame stream. The bricks being substantially composed of aggregated granules, their softening and fusion points are held up much more closely to the softening and fusion points of the raw clay stock; whereas, if the clay were ground, the softening and fusion point of the finished product would be below that of the original stock, largely because of the "flour" thereby formed. I have found by actual experience that bricks made in accordance with my invention are better than bricks made from the same material in the old way, particularly as to length of service. The fact that I am enabled to employ a small percentage of binder also contributes to the foregoing result.

With respect to the binder employed, I prefer to use one in which the clay or other material employed has a softening and fusion point approximately the same as those of the raw stock.

Another important advantage of the invention is that I am enabled to calcine the clay, before it is made into bricks, to high temperature without fusion or incipient fusion: this for the reason that while I am enabled to disintegrate the raw stock to a substantially uniform size, it is more granular in characteristic than powder. The large percentage of fine powder or flour in ground clay readily fuses. By being able to calcine the disintegrated clay to high temperatures before formation into bricks, it is possible to drive out combined moisture, for all practical purposes, whereas, this cannot be effectively done in any known burning or baking process now being used.

What I claim is:

1. A process for treating raw refractory brick clay which breaks down by weathering to a relatively granular condition as distinguished from a mud producing powder, which consists in artificially weathering the raw clay to a granular state by application of moisture and heat and calcining the granules 2. A process for treating raw refractory brick clay which breaks down by weathering to a relatively granular condition as distinguished from a mud producing powder, which consists in artificially weathering the raw clay to a granular state by application of moisture and heat, calcining the granules and adding a liquid binder to the calcined granules while they are relatively warm.

3. A process for treating raw refractory brick clay which breaks down by weathering to a relatively granular condition as distinguished from a mud producing powder, which consists in artificially weathering the raw clay to a granular state by application of moisture and heat, calcining the granules and adding a liquid binder to the calcined granules while they are relatively warm, the temperature of the added binder being substantially the same as that of the granules.

4. A process for treating raw refractory brick clay which breaks down by weathering to a relatively granular condition as distinguished from a mud producing powder, which consists in artificially weathering the raw clay to a granular state by application of moisture and heat and calcining the granules substantially to the service temperature of the bricks to be made out of the clay.

5. A process for treating raw refractory brick clay which breaks down by weathering to a relatively granular condition as distinguished from a mud producing powder, which consists in artificially weathering the raw clay to a granular state by application of moisture and heat, calcining the granules to a temperature sufficient to practically free them of combined moisture and mixing the calcined granules with an aqueous liquid binder while the granules are warm enough to dry out quickly the moisture introduced by the addition of the binder.

6. A process for treating raw refractory brick clay which breaks down by weathering to a relatively granular condition as distinguished from a mud producing powder, which consists in artificially weathering the raw clay to a granular state by application of moisture and heat and calcining the granules to a temperature sufficient to practically free them of combined moisture.

7. A process for treating raw refractory brick clay which breaks down by weathering to a relatively granular condition as distinguished from a mud producing powder, which consists in artificially weathering the raw clay to a granular state by application of moisture and heat and calcining the granules to a temperature sufficient to practically free them of combined moisture but not sufficient to cause fusion.

In testimony whereof, I have hereunto signed my name.

ENOCH P. STEVENS.